(12) United States Patent
Haarlander et al.

(10) Patent No.: US 9,635,969 B1
(45) Date of Patent: May 2, 2017

(54) INDEPENDENT DRAPERY CLAW

(71) Applicants: Michael E. Haarlander, Vero Beach, FL (US); Thomas M. Haarlander, Vero Beach, FL (US); Ira Brown, Wilmington, DE (US); Diane Brown, Wilmington, DE (US); Joe Brown, Wilmington, DE (US)

(72) Inventors: Michael E. Haarlander, Vero Beach, FL (US); Thomas M. Haarlander, Vero Beach, FL (US); Ira Brown, Wilmington, DE (US); Diane Brown, Wilmington, DE (US); Joe Brown, Wilmington, DE (US)

( * ) Notice: Subject to any disclaimer, the term of this patent is extended or adjusted under 35 U.S.C. 154(b) by 0 days.

(21) Appl. No.: 14/812,525

(22) Filed: Jul. 29, 2015

Related U.S. Application Data

(60) Provisional application No. 62/030,113, filed on Jul. 29, 2014.

(51) Int. Cl.
*A47H 19/00* (2006.01)
*F16B 2/10* (2006.01)
*G01C 15/00* (2006.01)

(52) U.S. Cl.
CPC ............... *A47H 19/00* (2013.01); *F16B 2/10* (2013.01); *G01C 15/004* (2013.01)

(58) Field of Classification Search
CPC .......... A47H 19/00; G01C 15/004; F16B 2/10
USPC .............................................. 132/277; 33/286
See application file for complete search history.

(56) References Cited

U.S. PATENT DOCUMENTS

| 5,428,867 A | * | 7/1995 | Hannerstig | ............ A47H 13/14 16/87.2 |
| 2004/0226574 A1 | * | 11/2004 | Winn | ....................... A45D 8/22 132/277 |

* cited by examiner

*Primary Examiner* — Abigail Morrell
(74) *Attorney, Agent, or Firm* — Wayne Edward Ramage; Baker Donelson

(57) ABSTRACT

A curtain holder or claw that gathers and securely holds a curtain or drapery in place. The holder comprises two sides biased to a closed or clamped position. The sides of the holder may comprise extensions to assist in gathering and holding fabric. The holder is independent and free-standing, and can be used at different heights and locations, with no connection or installation to walls or window frames and with no damage to the curtain or drapery fabric. One or more decorative elements may be permanently or removably attached to the holder. Decorative elements can be easily interchanged by a user to provide a plurality of decorative fixtures, elements, figures, logo, or indicia, or combinations thereof. These elements can match the room décor, or relate to a holiday, kid's themes, movies, animals, sports teams, or other topics or themes.

7 Claims, 3 Drawing Sheets

INDEPENDENT DRAPERY CLAW

This application claims benefit of and priority to U.S. Provisional Application No. 62/030,113, filed Jul. 29, 2014, and is entitled to that filing date for priority. The specification, figures and complete disclosure of U.S. Provisional Application No. 62/030,113 are incorporated herein by specific reference for all purposes.

FIELD OF INVENTION

This invention relates to an apparatus to assist in gathering and holding draperies, curtains and fabric in place.

BACKGROUND OF THE INVENTION

Curtain or drapery tiebacks typically are placed around a window curtain or drape to pull the fabric towards the sides of a window, door, or similar opening. With a window, this positioning allows natural illumination to enter the room. They also can provide some decoration to the room.

Curtain tiebacks available at present on the market are limited, however. Curtains are gathered in only one position. Further, many curtain tiebacks are designed to be mounted on a wall or frame, which requires tools and measurements for a relatively permanent installation in a fixed position (i.e., not easily changed). Damage to the wall results, and when such devices are removed, holes frequently are left in the wall.

SUMMARY OF THE INVENTION

In various exemplary embodiments, the present invention comprises a curtain holder or "claw" that gathers and securely holds a curtain or drapery in place. It can be used with drapery of any sort, including, but not limited to, curtains, sheers, or any similar hanging fabric arrangement. The curtain claw or clamp mechanism is biased to a closed or clamped position. The bias force can be provided by one or more springs or spring-like mechanism, the natural tension of the material (e.g., metal), or the like. The claw may opened by applying pressure to two opposing handles or arms corresponding to each side of the claw or clamp, and release of the pressure causes the claw or clamp to close.

In one embodiment, each side of the claw or clamp comprises one or more extensions or fingers. The extensions on opposing sides may directly oppose each other, or may be offset or overlap. In one embodiment, the sides are hingedly attached, and each side comprises five extensions, which are offset and overlap in a close position (with no material in-between). These extensions assist in gathering and holding fabric in place.

The claw or clamp mechanism attaches around the drapery at any given height to secure the drapery in place, and can be attached in different locations to create desired shape for privacy, illumination, or decoration, or combinations thereof. The device is free-standing: it is not attached to a wall or frame, and thus can be used at different heights and locations. Draperies can be held independently, with drapery thus being able to be pulled to the side, middle, or other part of the window or opening. No installation is required, eliminating any possibility of damaging walls or window frames. The design of the claw device also prevents any damage to the fabric of the curtain or drapery.

In several embodiments, one or more decorative elements may be attached to the claw or clamp. These decorative elements may be permanently or removably affixed. In one embodiment, the decorative element comprises a base with connectors that attach to corresponding connectors on the handles or arms or sides of the claw or clamp. In one embodiment, the connectors are male-female, and the male end of the locking mechanism that is attached to the back of the decorative base is inserted into the female end of the locking mechanism that is attached to the claw device (or vice versa). In another embodiment, the decorative element base is attached to the claw or clamp with magnets, hook-and-loop fabric, a clip, a hook, or other similar attachment means (as described below), or combinations thereof.

In some embodiments, some or all of the decorative base may be integrated with the claw or clamp. In one exemplary embodiment, one end of the decorative base may be hingedly or pivotally attached to one handle or arm of the claw, while the other end swings out and back to attach to the other handle or arm by means such as those described above.

When a decorative base is used, decorative elements may be attached to the base, and thus the claw or clamp. Means for attaching the decorative element include, but are not limited to, push pin, Velcro, sticky pad, magnet, screw, slide fastener, slide fastener with clip, pushpin release unit, toggle fastener, spring, pin plate, quick release pin, bolt, hook, lock washer, anchor, clamp, knot fastener, strap, snap, rivet, staple, or a combination thereof. Alternatively, the decorative element and base may be integrated. Further, decorative elements may be attached directly to the claw or clamp without a base.

Decorative elements thus can be easily interchanged by a user to provide a plurality of decorative fixtures, elements, figures, logo, or indicia, or combinations thereof. These elements can match the room décor, or relate to a holiday, kid's themes, movies, animals, sports teams, or other topics or themes. This provides design flexibility without permanent installation.

DETAILED DESCRIPTION OF EXEMPLARY EMBODIMENTS

In various exemplary embodiments, the present invention comprises a curtain holder or "claw" 2 that gathers and securely holds a curtain or drapery in place between two arms or sides. It can be used with drapery of any sort, including, but not limited to, curtains, sheers, or any similar hanging fabric arrangement.

Figure 1:
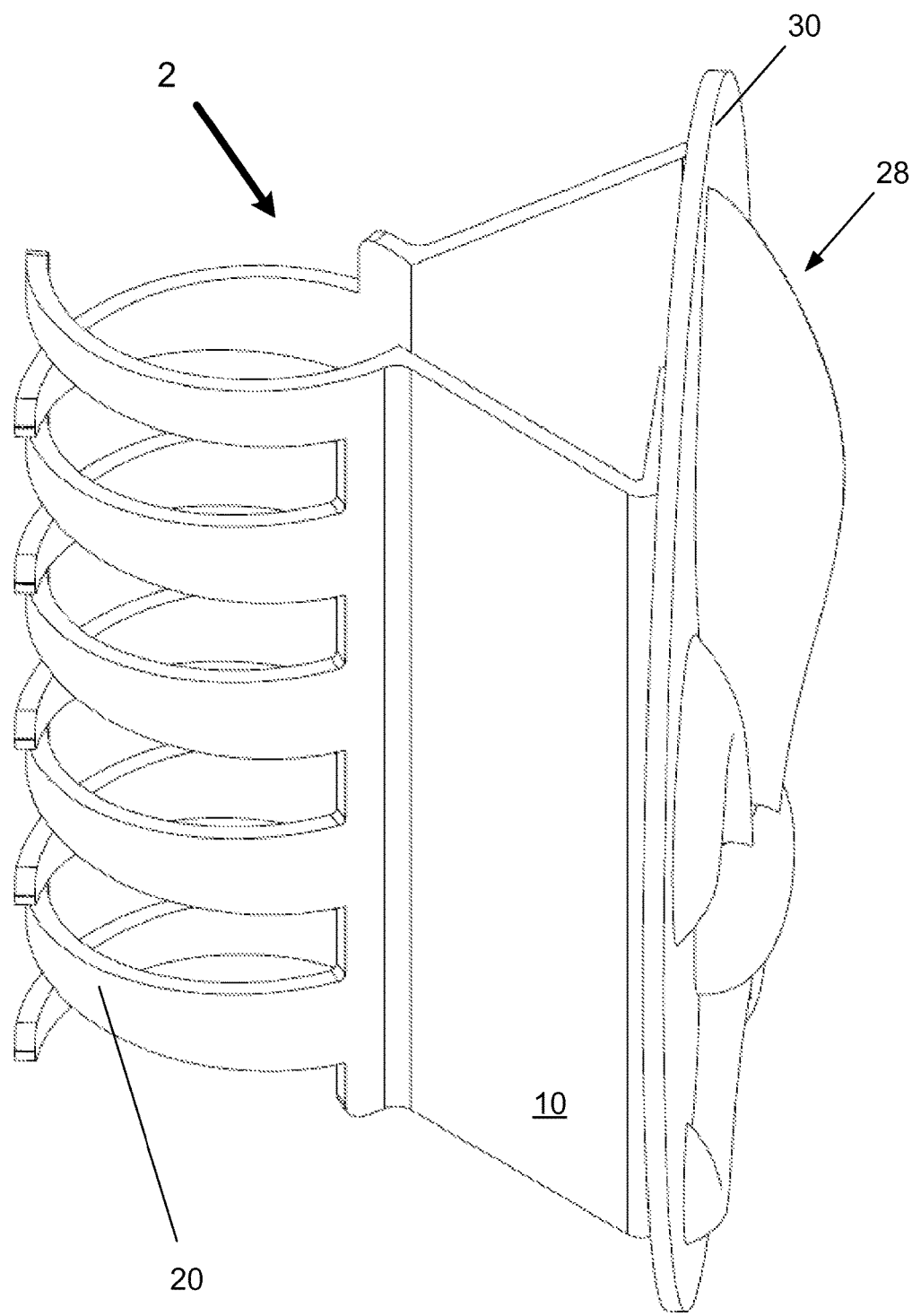
FIG. 1 shows a perspective view of a device in accordance with an embodiment of the present invention.
Figure 2:
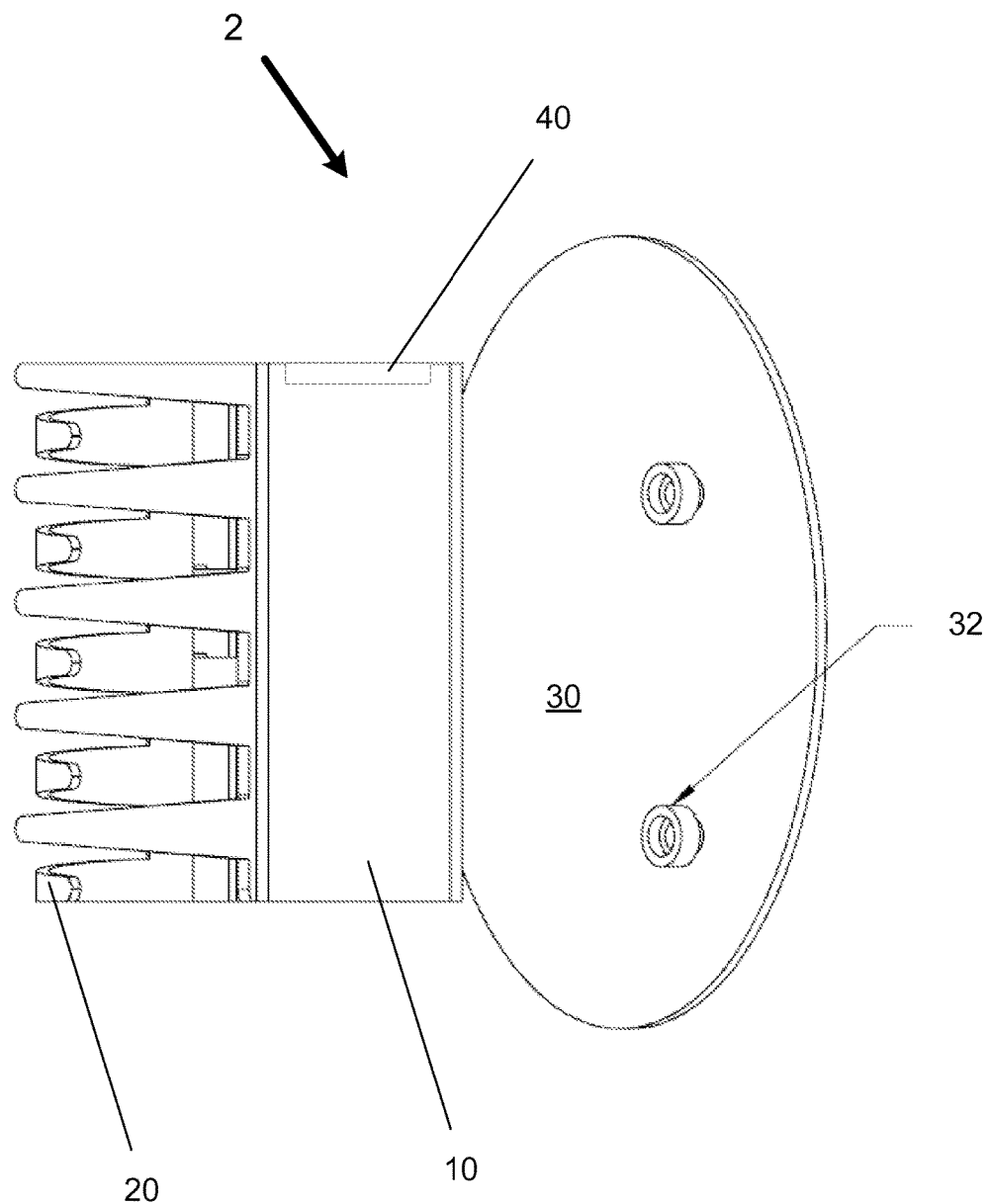
FIG. 2 shows a side view of the device of FIG. 1.
Figure 3:
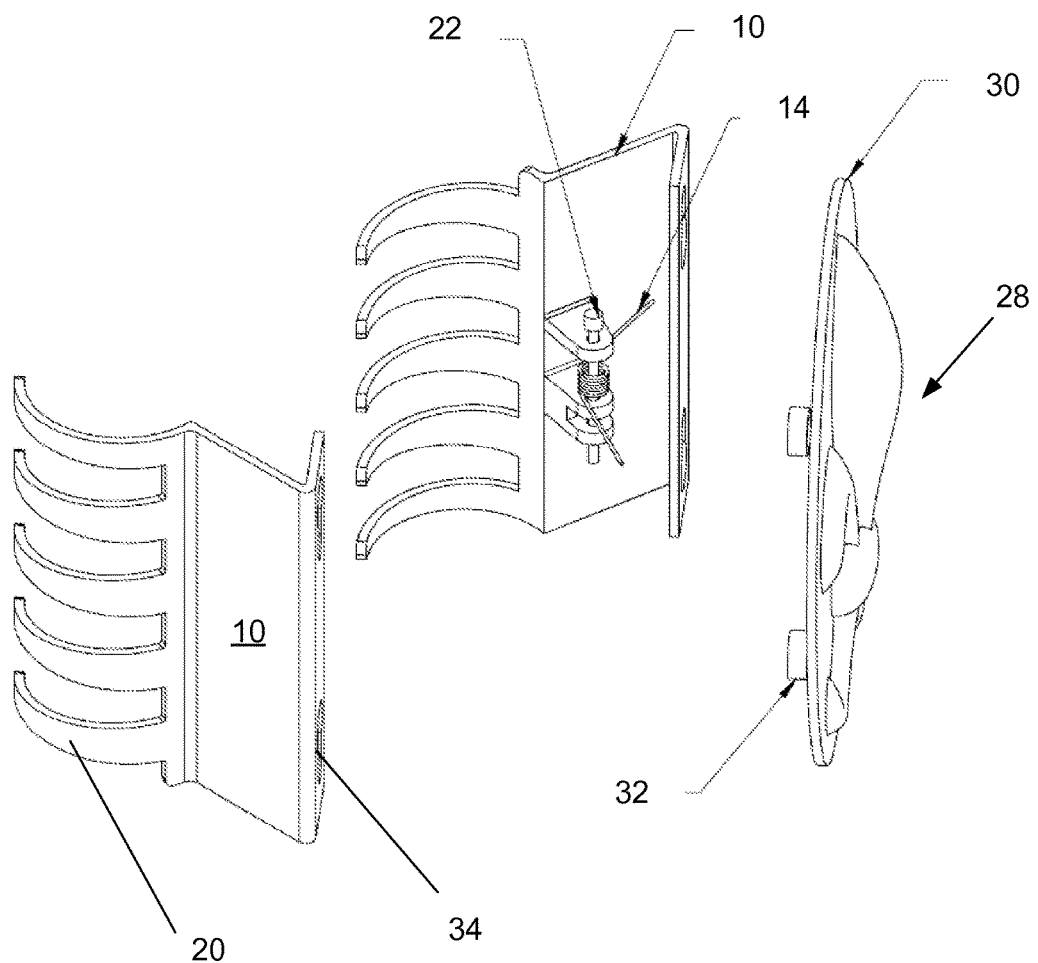
FIG. 3 shows an exploded view of the device of FIG. 1.

As seen in FIGS. 1-3, the curtain claw or clamp mechanism is biased to a closed or clamped position. The bias force can be provided by one or more springs or spring-like mechanism 14, the natural tension of the material (e.g., metal), or the like. The claw may opened by applying pressure to two opposing handles or arms 10 corresponding to each side of the claw or clamp, and release of the pressure causes the claw or clamp to close.

In one embodiment, each side of the claw or clamp comprises one or more extensions or fingers 20. The extensions or fingers may be smoothly curved, with rounded tips, to avoid damage to the drapery or curtain fabric. The extensions may comprise some or substantially all of an arm or side. The extensions on opposing sides may directly oppose each other, or may be offset or overlap. In the embodiment shown in FIGS. 1-3, the sides are hingedly attached (such as around a hinge pivot) 22, and each side comprises five extensions 20, which are offset and overlap in a close position (with no material in-between). These extensions assist in gathering and holding fabric in place.

The claw or clamp mechanism attaches around the drapery at any given height to secure the drapery in place, and can be attached in different locations to create desired shape for privacy, illumination, or decoration, or combinations thereof. The device is free-standing: it is not attached to a wall or frame, and thus can be used at different heights and locations. Draperies can be held independently, with drapery thus being able to be pulled to the side, middle, or other part of the window or opening. No installation is required, eliminating any possibility of damaging walls or window frames. The design of the claw device also prevents any damage to the fabric of the curtain or drapery.

In several embodiments, one or more decorative elements 28 may be attached to the claw or clamp. These decorative elements may be permanently or removably affixed. In one embodiment, the decorative element comprises a base 30 with connectors 32 that attach to corresponding connectors 34 on the handles or arms or sides of the claw or clamp. In one embodiment, the connectors are male-female, and the male end of the locking mechanism that is attached to the back of the decorative base is inserted into the female end of the locking mechanism that is attached to the claw device (or vice versa). In another embodiment, the decorative element base is attached to the claw or clamp with magnets, hook-and-loop fabric, a clip, a hook, or other similar attachment means (as described below), or combinations thereof.

In some embodiments, some or all of the decorative base may be integrated with the claw or clamp. In one exemplary embodiment, one end of the decorative base may be hingedly or pivotally attached to one handle or arm of the claw, while the other end swings out and back to attach to the other handle or arm by means such as those described above.

When a decorative base is used, decorative elements may be attached to the base, and thus the claw or clamp. Means for attaching the decorative element include, but are not limited to, push pin, Velcro, sticky pad, magnet, screw, slide fastener, slide fastener with clip, pushpin release unit, toggle fastener, spring, pin plate, quick release pin, bolt, hook, lock washer, anchor, clamp, knot fastener, strap, snap, rivet, staple, or a combination thereof. Alternatively, the decorative element and base may be integrated. Further, decorative elements may be attached directly to the claw or clamp without a base.

Decorative elements thus can be easily interchanged by a user to provide a plurality of decorative fixtures, elements, figures, logo, or indicia, or combinations thereof. These elements can match the room décor, or relate to a holiday, kid's themes, movies, animals, sports teams, or other topics or themes. This provides design flexibility without permanent installation.

While two claws or clamps typically are used (i.e., one for the curtain on each side of window), multiple claws or clamps of the present invention can be used on each curtain or drape to provide different effects.

In another exemplary embodiment, the claw or clamp further comprises a laser-leveling device or tool 40. This laser-leveling tool allows the user to accurately position the claw device on the curtain at the same exact height of an opposing claw device or devices being used on the opposite side of the window. The laser-leveling tool may be hidden from the exterior appearance of the claw device, and may be integrated with the device, or removably attached thereto.

The claw or clamp may be made of any suitable material, including but not limited to plastic, metal, nylon, wood, rubber, fabric, or a combination thereof, and may be rigid or flexible in whole or in part. Likewise, the device may be made in a variety of colors, sizes and configurations.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. An apparatus for securely holding a curtain or drapery, comprising:
   at least two holders, each holder with a front side and a back side and comprising
      two arms hingedly or pivotedly attached, each arm comprising a first end and a second end, wherein the respective first ends of each arm are biased together in a closed position, and further wherein the arms are moved from a closed position to an open position by pressure applied to one or both second ends of said arms; and
      a plurality of extensions on the first end of each arm, said extensions adapted to securely hold curtain or drapery fabric when the holder is in a closed position; and
   a laser level integrated into the front side of at least one of said holders;
   wherein the holder is independent of, and without direct connection to, a wall or window frame.

2. The apparatus of claim 1, each holder further comprising a spring positioned between the arms to bias said arms together in said closed position.

3. The apparatus of claim 1, each holder further comprising one or more decorative elements attached to said holder.

4. The apparatus of claim 3, each holder further comprising a decorative element base removably attached to said holder, wherein said one or more decorative elements are attached to said decorative element base.

5. The apparatus of claim 4, wherein said one or more decorative elements are removably attached to said decorative element base.

6. The apparatus of claim 3, wherein said one or more decorative elements are removably attached to said holder.

7. The apparatus of claim 1, wherein the extensions on each arm are offset so that opposing extensions overlap when the holder is in said closed position.

* * * * *